United States Patent [19]

Turner

[11] 4,021,134
[45] May 3, 1977

[54] EXTRUSION DIE AND CUTTING TOOL FOR MACHINING SUCH A DIE

[75] Inventor: Charles L. Turner, Delran, N.J.

[73] Assignee: General Refractories Company, Philadelphia, Pa.

[22] Filed: Nov. 4, 1975

[21] Appl. No.: 628,754

Related U.S. Application Data

[62] Division of Ser. No. 356,357, May 2, 1973.

[52] U.S. Cl. .............................. 408/204; 29/103 R
[51] Int. Cl.² ..................... B23B 41/02; B26D 1/12
[58] Field of Search ................ 29/95, 95 B, 103 A, 29/103 R, 105 R, 105 A; 144/219; 408/204

[56] References Cited

UNITED STATES PATENTS

| | | | |
|---|---|---|---|
| 2,062,257 | 11/1936 | Douglas et al. | 408/204 |
| 3,227,013 | 1/1966 | Zimmermann | 408/204 |
| 3,308,689 | 3/1967 | MacDonald | 408/204 |
| 3,351,998 | 11/1967 | Theiler | 29/105 R |
| 3,387,637 | 6/1968 | Ferguson et al. | 408/204 |
| 3,609,056 | 9/1971 | Hougen | 408/204 |

Primary Examiner—Harrison L. Hinson
Attorney, Agent, or Firm—Everett H. Murray, Jr.

[57] ABSTRACT

The invention provides a hollow mill cutting tool capable of forming a cylindrical pin on one face of a plate member by removing material from the plate member. The cutting tool comprises a generally cylindrical member terminating in a tip portion having a toroidal cross-section and having its axis aligned with the cylindrical member. The inside diameter of the protruding end of the tip portion is selected to be the desired diameter of the cylindrical pin. The tip portion includes a plurality of forward helical surfaces each terminating at a forward end in a cutting edge extending across the thickness of the toroidal cross-section. Each helical surface extends rearwardly along a cylindrical path from the cutting edge at an angle of about 8°–11° with a plane transverse of the axis of the cylindrical member. A back helical surface, which is inclined at an angle of at least 55° to a plane parallel to the axis, is connected to each of the foward helical surfaces. A generally longitudinally-extending surface is connected at one end to the forward end of one of the forward helical surfaces to form a cutting edge, and the other end of each longitudinally-extending surface is connected to the rear end of an adjacent back helical surface.

6 Claims, 10 Drawing Figures

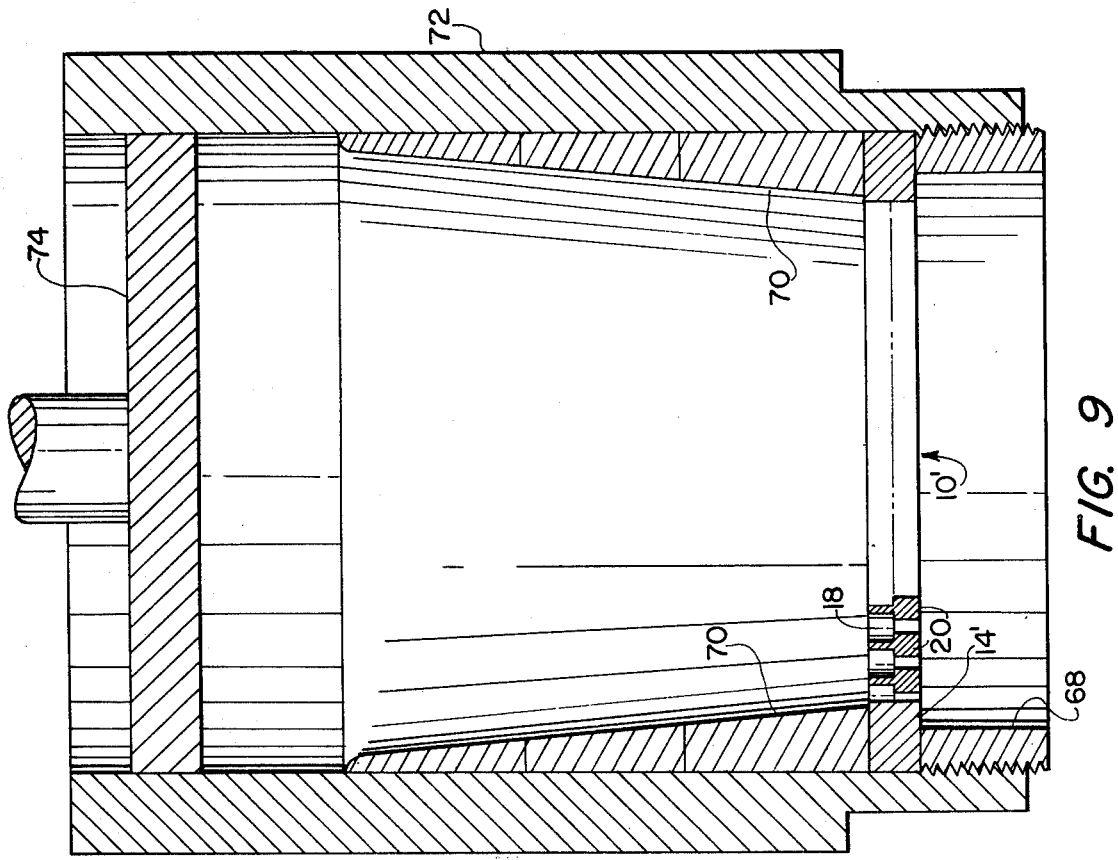
FIG. 9
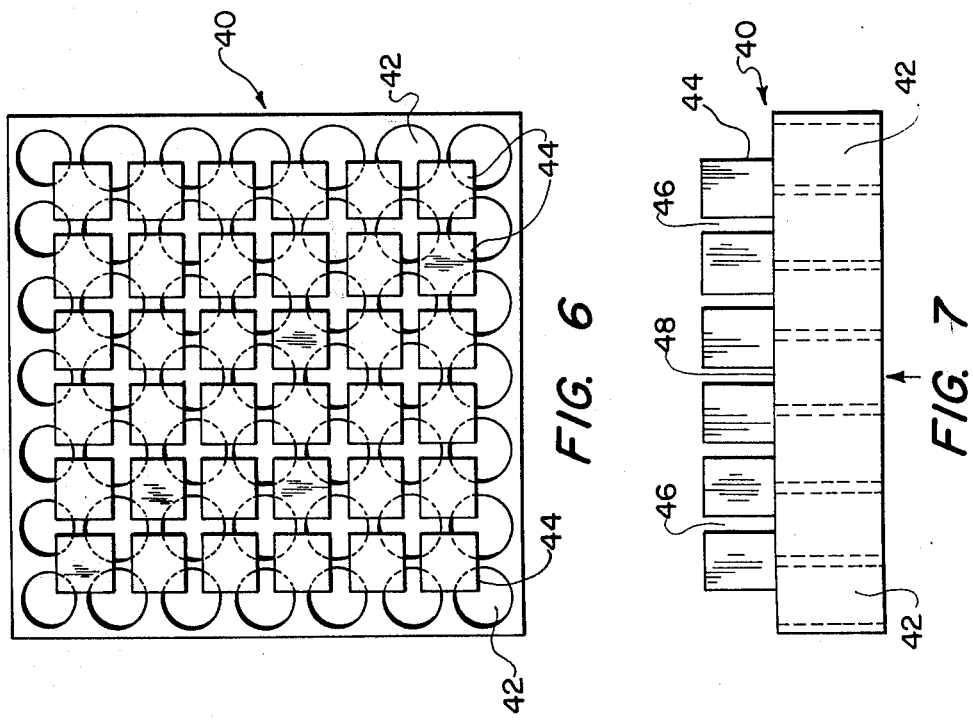
FIG. 6
FIG. 7

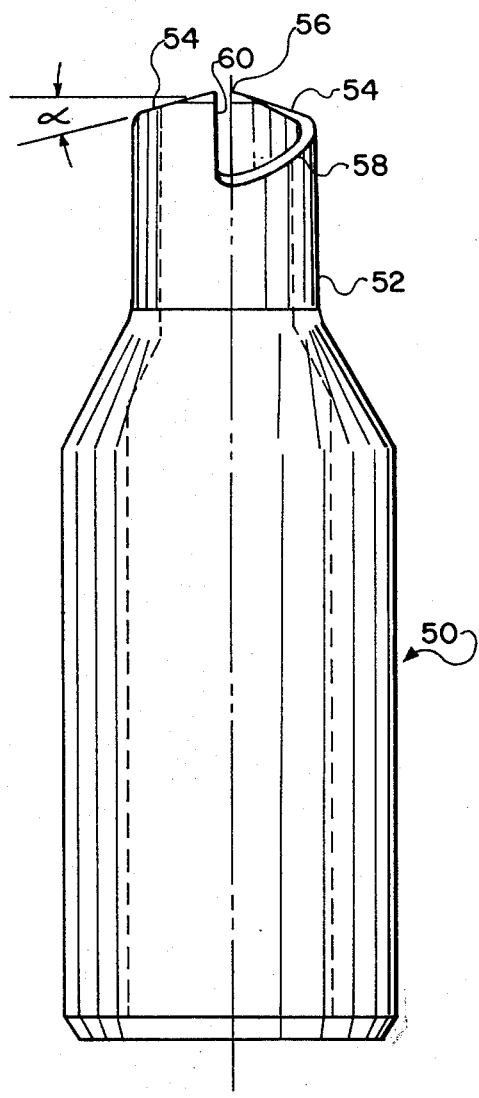
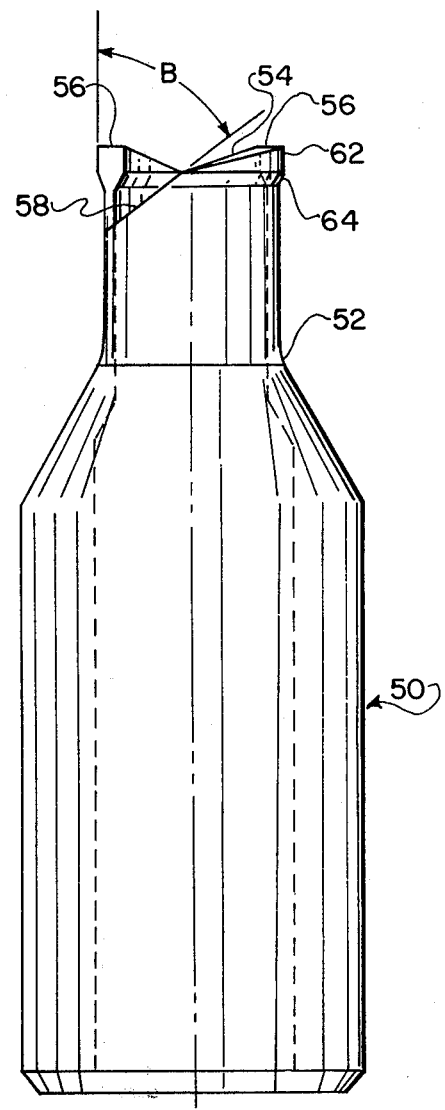
FIG. 8A
FIG. 8B

EXTRUSION DIE AND CUTTING TOOL FOR MACHINING SUCH A DIE

SPECIFICATION

This case is a division of U.S. application Ser. No. 356,357, filed May 2, 1973 and assigned to same assignee as the present case.

Field of the Invention

This invention relates to an extrusion die, and more particularly to a die plate for forming a plurality of closely spaced, longitudinally-extending ducts in ceramic material being extruded, and also to a cutting tool for forming such a die plate.

BACKGROUND OF THE INVENTION

Ceramic articles containing spaced longitudinal ducts in which the elongated ducts are parallel, possess high compressive strength longitudinally. These articles are useful as catalyst supports and heat exchange elements.

Honeycomb articles containing a plurality of spaced parallel ducts have been manufactured from plastics, using an apparatus which includes a support plate with channels and a large number of shaping elements screwed centrally onto the support plate. The shaping elements have the dimensions and conformation corresponding to the cross-section of the elongated ducts.

It is possible with such an apparatus to extrude plastic articles in the form of a continuous circle. It is not, however, possible to extrude relatively viscous compounds such as ceramic materials with such an apparatus, because the strength and stability of the apparatus is inadequate for the extrusion pressures required.

More particularly, it has been difficult or impossible to manufacture with such an apparatus ceramic articles containing ducts of an extremely small diameter. The problems involved in fastening the shaping elements on the support plate, and also the incorporation of the feed bores for the material in the support plate, have in the past led to the production of only relatively large hollow channels in a finished creamic honeycomb element.

Various multi-element devices including a plurality of forming members have been proposed for use in extruding ceramic articles to alleviate the above-noted problems. In general, these multi-element devices require disassembly of the die into its multiplicity of elements for cleaning, and subsequent re-assembly for use. The disassembly and re-assembly for cleaning adds to the labor expense of a manufacturing operation using such a die structure. Further, the possibility exists that the material being extruded may sometimes cure or stiffen in the die to an extent that makes disassembly of the die difficult or impossible. In such multi-element dies, the die must be disassembled immediately after use and cleaned or there is a possibility of the die thereafter being usable only after an involved cleaning operation or becoming inoperative.

BRIEF DESCRIPTION OF THE INVENTION

The invention provides an extrusion die for forming a plurality of closely spaced, longitudinally-extending ducts in material to be extruded. The die comprises an integral plate member including an upstream face that includes a plurality of closely spaced, longitudinally-extending passages. These passages permit flow of material through the upstream face of the plate member in the form of a plurality of discrete ribbons. The downstream face of the plate member is formed by a plurality of transversely spaced members having a closed perimeter in a plane transverse of the direction of material flow, and extending longitudinally of the flow direction. The spaced members are separated by an interconnected recessed area that has the desired cross-section of the product being formed by extrusion through the die. The passages terminate at the upstream end of the recessed area with their axes aligned generally parallel to the flow direction at a plurality of spaced locations. One of the spaced members blocks a portion of the crosssection of each of the passages to force the material being extruded to fill the entire recessed area.

Preferably, the passages are cylindrical and the spaced longitudinally-extending members are solid cylindrical pins and a pair of solid cylindrical pins extend into the flow path of the material out the exit end of each cylindrical passage.

In a preferred embodiment, except at the perimeter of the downstream face of said plate member, any given cylindrical pin is surrounded by six other cylindrical pins having their axes spaced approximately an equal distance from the axis of said given cylindrical pin.

The invention provides an extrusion die that is capable of accurately forming very tightly spaced, small diameter, parallel ducts in a ceramic article. The high surface area and low pressure drop for flow of gas through the ceramic articles that can be formed using the die of this invention, makes the articles well suited for catalyst supports in automotive pollution control devices.

The invention also provides a hollow mill cutting tool capable of forming a cylindrical pin on one face of a plate member by removing material from the plate member. The cutting tool comprises a generally cylindrical member terminating in a tip portion having a toroidal cross-section and having its axis aligned with the cylindrical member. The inside diameter of the protruding end of the tip portion is selected to be the desired diameter of the cylindrical pin. The tip portion includes a plurality of forward helical surfaces that each terminate at their forward end in a cutting edge extending across the thickness of the toroidal cross-section. Each helical surface extends rearwardly along a cylindrical path from the cutting edge at an angle of from about 8°–11° with a plane transverse of the axis of the cylindrical member. A back helical surface, which is inclined at an angle of at least 55° to a plane parallel to the axis, is connected to each of the forward helical surfaces. A generally longitudinally-extending surface is connected at one end to the forward end of one of the forward helical surfaces to form a cutting edge, and the other end of each longitudinally-extending surface is connected to the rear end of an adjacent back helical surface.

The use of a thin integral plate member according to the invention makes cleaning of the die a relatively easy task. Generally, water under supply pressures can be directed at the die to remove ceramic material from the die after use. The relatively small thickness of the plate member, preferably less than 0.500 in. permits water spray to penetrate to the interior of the passages at the upstream face and the recessed area at the downstream face of the plate member.

The present invention provides the only die means known to the inventor for forming 100 or more tightly-spaced parallel ducts per square inch of cross-section in extruded ceramic material. The interrelated problems of ensuring uniform flow distribution of the ceramic material to provide an extruded article of uniform cross-section, and avoidance of extremely high operating pressures across the die member becomes more and more acute as the number of ducts desired per square inch of die face is increased. The present die structure is designed to provide highly uniform thin webs surrounding small diameter ducts and will operate at workable ram extrusion pressures. That is, the ram extrusion pressures required to force ceramic material through the die do not quickly cause stress failure of the die, and do not require specially designed high pressure extrusion equipment. Present experience suggests that the die plate members of the invention will have a long operating life.

BRIEF DESCRIPTION OF THE DRAWINGS

Of the drawings:

FIG. 6 is a plan view of the downstream face of a die plate member for forming a square cell honeycomb article;

FIG. 7 is an elevation view of the die plate member of FIG. 6;

FIG. 8A illustrates one embodiment of a hollow mill cutting tool used to machine pins on the downstream face of the plate member of FIG. 1;

FIG. 8B is a view of an embodiment of the cutting tool constituting a slight variation from the embodiment of FIG. 8A, illustrating the tool rotated 90° in a clockwise direction about its axis with respect to the position of the embodiment of FIG. 8A.

FIG. 9 illustrates a die plate member of this invention installed in an extruder.

DETAILED DESCRIPTION OF PREFERRED EMBODIMENTS OF THE INVENTION

Figure 1:
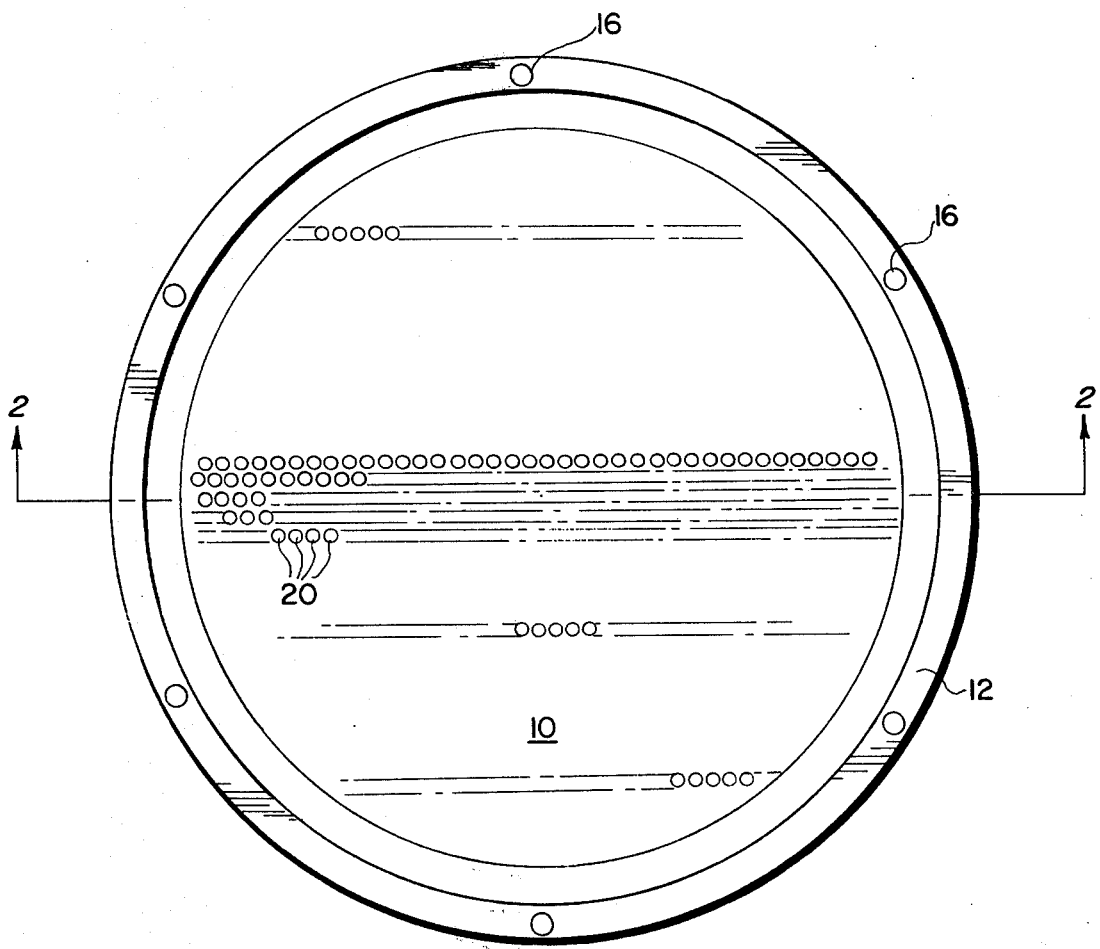
FIG. 1 is a plan view of the downstream face of a plate member of one embodiment of the die of this invention that for ease of viewing illustrates only a portion of the spaced members on the downstream face of the plate member, and does not depict spaced passages which extend from the upstream face of the plate member.

An embodiment of the invention comprising an extrusion die for forming a plurality of closely spaced, longitudinally-extending ducts in the material to be extruded therethrough is illustrated in FIGS. 1–5. A die member illustrated in FIGS. 1 and 2 comprises an integral plate member generally 10 and a collar 12 that is a toroidal solid having the same outside diameter as plate member 10 and a flat face portion that abuts the outer shoulder 14 of plate member 10. Collar 12 is releasably attached to plate member 10 by a plurality of threaded members 16 that engage threaded holes in plate member 10.

Figure 2:
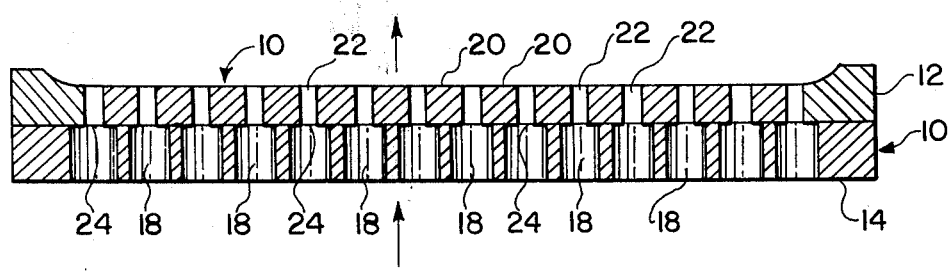
FIG. 2 is a section taken along line 2—2 of FIG. 1.
Figure 3:
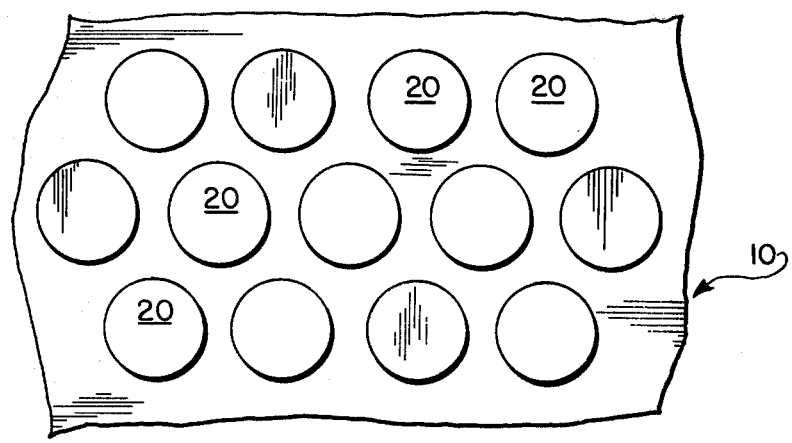
FIG. 3 is a plan view of a portion of the downstream face of the plate member of FIG. 1 after completion of machining on the downstream face.

As best illustrated in FIG. 2, plate member 10 has an upstream face comprising a plurality of closely spaced, longitudinallyextending passages 18 which permit flow of material through the upstream face of plate member 10 in the form of a plurality of discrete ribbons. The downstream face of plate member 10 is formed by a plurality of transversely spaced cylindrical pins 20. Each of the pins has a closed circular perimeter in a plane transverse of the direction of the material flow through plate member 10, and extends longitudinally of the flow direction. Each pin 20 is separated from other pins by an interconnected recessed area 22. The cross-section of recessed area 22 is selected to have the desired cross-section of the product being formed by extrusion through the die and is uniform throughout the length of pins 20.

Passages 18 terminate at the upstream end 24 of the recessed area 22 with the axes of the passages 18 aligned generally parallel to the flow direction of material through plate member 10. This flow direction is preferably transverse of the upstream face of plate member 10. Passages 18 terminate at a plurality of spaced locations, with a pair of pins 20 blocking a portion of the cross-section of each of passages 18 to force the material being extruded to fill the entire volume of the recessed area 22 between upstream end 24 and the exit face of plate member 10. As used in the specification and claims, the term "exit face" or "downstream face" of the plate member refers to the plane extending through the downstream end of the spaced members (pins 20). The term "upstream face" or "inlet face" of plate member 10 refers to the plane of the other face of plate member 10, which was a flat planar surface prior to removal of material that forms passages 18. Collar 12, which is spaced from adjacent peripheral pins a distance that is about equal to the spacing between pins, allows the formation of a continuous peripheral film of material having a thickness equal to the wall thickness of the webs of the honeycomb core.

Preferably, and as illustrated in FIGS. 1–5, passages 18 are cylindrical, and pins 20 are solid cylinders. In the illustrated embodiment, a pair of cylindrical pins 20 extend into the flow path of the material out the exit end of all passages 18 except those at the perimeter of plate member 10 where only a single pin extends into the flow path of the peripheral passages. Thus, a pair of pins extends into the flow path of a majority of cylindrical passages 18.

Figure 4:
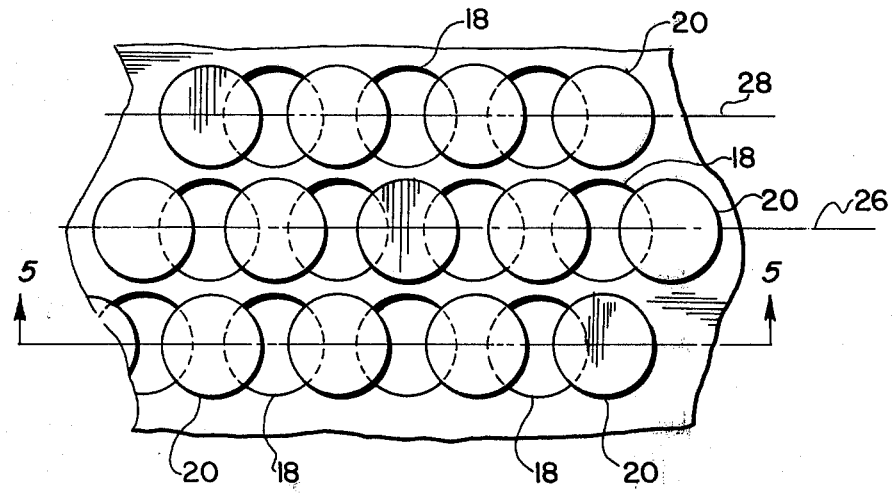
FIG. 4 is a plan view of the downstream face of the plate member as illustrated in FIG. 1 after spaced passages have been drilled in the upstream face of the plate member.
Figure 5:
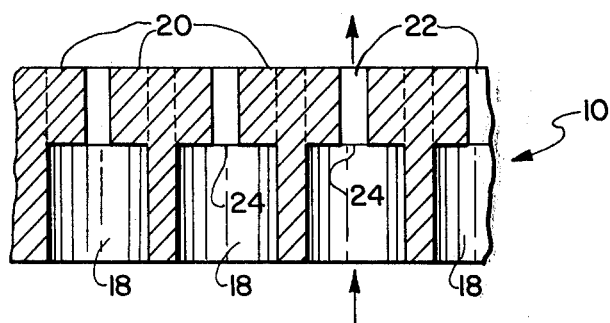
FIG. 5 is a section taken along line 5-5 of FIG. 4.

As best illustrated in FIG. 4, spaced cylindrical passages 18 terminate at locations that are spaced about the periphery of the upstream end of each of pins 20. This spacing permits discharge of material from passage 18 at a plurality of locations about the periphery of each pin 20 and helps insure that the desired intricate cross-section of the articles can be achieved during only a short length of flow through the downstream portion of the plate member.

Preferably, and as illustrated in the embodiment of FIGS. 1–5, any given spaced cylindrical pin 20 is surrounded by six other cylindrical pins 20 except for pins located adjacent to the perimeter of plate member 10. Each of the six cylindrical pins 20 spaced about a given pin 20 has its axis spaced approximately an equal distance from the axis of the given cylindrical pin. The resulting product formed by extruding past pins 20 spaced as above produces a hexagonally close-packed array of longitudinally-extending ducts. This arrangement permits forming an extremely high number of small diameter ducts per square inch of extruded article, and enhances the strength properties of the extruded article and particularly the resistance to transversely applied compressive forces.

It is possible to utilize 100 pins per square inch of downstream face of plate member 10 and thus provide 100 ducts per square inch. Indeed, dies having pin densities of over 195 per square inch have been made and used to successfully extrude uniform ceramic articles having over 195 ducts per square inch.

In the preferred embodiment of the invention, as illustrated in FIGS. 1-5, the passages 18 extend transversely of the upstream face of plate member 10 and are aligned with the direction of flow to permit flow of material through the upstream face with a minimum of pressure drop. It is also preferred that the ratio of the cross-sectional area of the recessed area 22 to the combined cross-sectional area of passages 18 be between 0.65 and 1.0, with optimum results for extruding ceramic mixes presently being achieved with a ratio of about 0.75.

In the extrusion of ceramic material, it has also been found desirable to make the length of pins 20 from about 0.090-0.15 inches. If the length of pins 20 is loess than 0.090 in., it has been found that it is difficult to achieve finished articles having uniform cross-sections. If the length of pins 20 is more than 0.15 in., excess extrusion pressures must be used to counteract the increased frictional resistance of thick viscous material, such as a ceramic mix, in prolonged contact with pins 20.

The desirable length of passages 18 is similarly determined by (a) the need to achieve material flow across the cross-section of each passage before material reaches recessed area 22 and (b) the need to minimize frictional resistance of the die plate member to material flowing therethrough. Generally, the length of passages 18 can vary from 0.125 to 0.500 in. with about 0.250 in. being presently preferred.

The die plates of this invention are desirably formed of cold rolled, low carbon steel for ease of machining. The crystal direction of the steel should be aligned with the direction of milling so that it is not necessary to drill or mill across the crystallographic axis. Preferably, the die plate members are coated with electroless nickel prior to use to prevent corrosion and to reduce the amount of friction that resists flow of material through the die plate member.

As best illustrated in FIG. 4, a presently preferred alignment of the passages and pins for purposes of each of fabrication, and for ensuring uniform distribution of the material about pins 20, is provided by aligning the axes of pins 20 and passage 18 in a plurality of parallel planes. The repeating sequence along a given plane, such as depicted by line 26 in FIG. 4, comprises: (1) pin, (2) passage, (3) pin. The axis of a passage is spaced about midway along plane 26 between the adjacent axes of the pins. The axes of individual pins in plane 28 adjacent to given plane 26, are (a) offset horizontally with respect to FIG. 4, from the position of the axes of the pins in plane 26, and (b) are vertically aligned with the axes of passages 28 in plane 26.

FIGS. 6 and 7 disclose another embodiment of the die of this invention. This embodiment is designed for extruding ceramic articles having a plurality of longitudinally-extending, rectangular ducts.

The die of FIGS. 6 and 7 comprises an integral plate member, generally 40, having an upstream face comprising a plurality of spaced circular passages 42 which permit flow of material through the upstream face of plate member 40. The downstream face of plate member 40 is formed by a plurality of transversely spaced solid rectangular pins 44 preferably having a square cross-section. Each of the pins has a closed rectangular perimeter in a plane transverse of the direction of the material flow through plate member 40, and extends longitudinally of the flow direction. Each pin 44 is separated from other pins by an interconnected recessed area 46 that has the desired crosssection of the product being formed by extrusion through the die.

Passages 42 terminate longitudinally at the upstream end 48 of recessed area 46 with the longitudinal axis of each passage 42 aligned generally parallel to the flow direction of material through plate member 10.

Passages 42 terminate at a plurality of laterally spaced locations, with four of pins 44 blocking a portion of the cross-section of each of other than the peripheral passages 42. The presence of four pins 44 forces the material being extruded through each passage to flow transversely to fill the entire volume of recessed area 46 between upstream end 48 and the exit face of plate member 40. As illustrated in FIGS. 6 and 7, pins 44 are rectangular solids having a square cross-section in a plane transverse of the flow direction, and circular passages 42 have a round hollow cross-section, and pins 44 and passages 42 are of constant cross-section along their length.

As illustrated in the embodiment of FIGS. 1-5 and 6-7, it is preferred that the exit end of the passage be in a common plane and that the inlet end of the recessed area and the upstream end of the pins lie in the same common plane.

FIGS. 8A and 8B illustrate similar embodiments of a hollow mill cutting tool that are particularly adapted for forming cylindrical pins, such as pins 20 illustrated in FIGS. 1-5. In general, the cutting tool forms a cylindrical pin by removing material that lies adjacent the cylindrical surface of the pin.

FIGS. 8A and 8B illustrate cutting tools including a generally cylindrical member 50 that terminates in a tip portion 52 that has a toroidal cross-section. The axis of tip portion 52 is aligned with the axis of cylindrical member generally 50.

Tip portion 52 includes a pair of forward helical surfaces 54 that each terminate at their forward end in a cutting edge 56. Cutting edges 56 extend across the thickness of the toroidal cross-section of tip member 52. Each forward helical surface extends rearwardly along a cylindrical path from cutting edge 56 at an angle as illustrated in FIG. 8A of from 9° to 11° with a plane transverse of the longitudinal axis of cylindrical member, generally 50. The angle $\alpha$, as illustrated in FIG. 8A is important to obtaining good cutting action from the cutting tool, which is rotated in a clockwise direction during cutting operations. As illustrated in FIG. 8A, the angle $\alpha$ is defined as the angle between a plane transverse of the longitudinal axis of cylindrical member generally 50, and the angle at which forward helical surface 54 extends rearwardly along a cylindrical path from cutting edge 56. If the angle $\alpha$ is less than 8°, very little cutting action is obtained. If the angle $\alpha$ is over 11°, the strength of the tool is reduced near the cutting edges. Preferably, the angle $\alpha$ is 10°.

A plurality of back helical surfaces 58 are provided with each back helical surface 58 connected to one forward helical surface 54 preferably with a smoothly curved portion connecting these two helical surfaces. Each back helical surface adjacent its rearward end, and at approximately a longitudinal distance from cutting edge 56 that corresponds to the desired length of the cylindrical pin being machined, is inclined at an angle $\beta$ as illustrated in FIG. 8B of at least 55° to a plane parallel to the axis of cylindrical member 50, with a presently preferred angle $\beta$ being 55°. It is important that back helical surface be inclined at an angle of at least 55° to insure the presence of clearance for discharge of displaced materials away from cutting tool during cutting operations.

A plurality of generally longitudinally-extending surfaces 60 are provided, with one of the longitudinally-extending surfaces connected at one end to one of the forward helical surfaces 54 to form a cutting edge 56. The other end of each longitudinally-extending surface 60 is connected to the rear end of an adjacent back helical surface 58.

As illustrated in FIG. 8B, tip portion 52 includes a short length 62 that is parallel to the axis of cylindrical member, generally 50, and an inwardly inclined portion 64 that tapers inwardly along its length towards the axis of cylindrical member 50. The linear dimension of length 62 is selected to be less than the desired length of the cylindrical pins being machined.

Preferably, the cutting tools of this invention have cutting edges which each lie in a common plane transverse of the longitudinal axis of cylindrical member 50, and two cutting edges, two forward helical surfaces 54, two back helical surfaces 58, and two longitudinal surfaces are provided. It is also desirable that cutting edges 56 extend radially out from the longitudinal axis of cylindrical member, generally 50, and across the thickness of the toroidal cross-section of the forward end of tip portion 52.

The hollow mill cutting tool is made from a tool steel and hardened. The cutting portion of the tool is hardened to a Rockwell hardness of 60 to 62.

FIG. 9 illustrates another embodiment of an extrusion die plate of this invention installed in a ram extruder. It is presently preferred to extrude horizontally and to deposit the extrudate on a conveying means that moves away from the die plate at about the same rate of speed that the material passes through the die plate.

With reference to FIG. 9, a plate member 10' is illustrated that differs from plate member 10 illustrated in FIGS. 1–5 in that shoulder portion 14' of plate member 10' has not been machined down for seating a collar. Instead, no collar is used with plate member 10', which is held by retainer ring 68 against nozzle member 70 that is welded to barrel member 72 of the extruder.

The inner wall surface of barrel member 72 is threaded adjacent the exit of the barrel member 72 to permit the threaded retainer ring 68 to be advanced into barrel member 72 and thus force plate member 10' into abutting contact with nozzle member 70.

In operation, ram 74 is used to force material through plate member 10' and form a length of material containing a plurality of longitudinally-extending ducts at closely spaced intervals across the cross-section of the extrudate.

The use of the die plate of this invention is illustrated in the following example in which 1400 grams Georgia kaolin, 400 grams of Victoria clay; and 1400 grams talc, each having the original analysis listed below and then screened to remove +100 mesh material; and 800 grams of fused cordierite (−200 mesh) are dry blended in a paddle mixer for five minutes. Subsequently, 60 grams of Vee Gum T (a colloidal magnesium aluminum silicate, sold by R. T. Vanderbilt Co.), and 1040 ml of distilled water are added and the mixture is blended for 5 more minutes in a paddle mixer.

The thoroughly mixed batch is transferred to the barrel of an extruder as schematically illustrated in FIG. 9. The admixed composition is subjected to a vacuum in the extruder to remove air therefrom and is extruded through a 5 in. diameter die having the arrangement of passages 18 and pins 20 illustrated in FIGS. 2 and 4. The die has a thickness of about 0.250 and the pins are about 0.125 in. long. The pins are densely packed, about 154 pins per square inch of downstream face of the die. Extrusion speed for the batch is about 36 inches of product per minute. The pressure at the upstream face of the die is about 200 psi.

The extruded material is of uniform cross-section and can be cut to lengths, dried and fired to form a catalyst support.

The composition of the ceramic materials used to form the extrudable batch is listed below.

|  |  | Prochlorite[1] Talc | Georgia [1] Kaolin | Calcined[2] Clay | Ball Clay[1] (Weldon) | Ball Clay[1] (Victoria) |
|---|---|---|---|---|---|---|
| | $SiO_2$ | 30.70 | 45.45 | 54–55 | 52.01 | 57.17 |
| | $Al_2O_3$ | 22.0 | 38.26 | 42–43 | 30.34 | 28.45 |
| | $Fe_2O_3$ | 1.82 | 0.73 | 0.75 | 0.97 | 0.96 |
| | $TiO_2$ | 0.08 | 1.25 | 0.08 | 1.64 | 1.69 |
| CHEMICAL | $MnO_2$ | Trace | — | — | — | — |
| ANALYSIS | CaO | 0.20 | 0.21 | 0.10 | 0.35 | 0.26 |
| | MgO | 32.08 | 0.04 | 0.10 | 0.17 | 0.20 |
| | $Na_2O$ | 0.25 | 0.11 | 0.10 | 0.20 | 0.31 |
| | $K_2O$ | 1.20 | 0.21 | 1.5–2.0 | 0.38 | 0.21 |
| | LOI | 12.68 | 13.47 | — | 13.85 | 10.78 |
| | TOTAL (%) | 99.76 | 99.89 | — | 99.91 | 100.03 |
| | % minus 30 | 85.6 | — | — | — | — |
| | % minus 10 | 31.5 | 88.5 | — | 97.5 | 88.0 |
| PARTICLE | % minus 5 | 15.7 | 78.0 | — | 94.5 | 82.0 |
| SIZE | % minus 2 | 6.8 | 59.5 | — | 85.0 | 75.0 |
| IN MICRONS | % minus 1 | 3.6 | 50.0 | — | 73.5 | 65.5 |
| | % minus 0.5 | 1.9 | 32.0 | — | 58.0 | 52.0 |
| | % minus 0.2 | 1.0 | 12.5 | — | 34.5 | 29.5 |
| | % minus 200 Mesh | 99.5 | — | 99.9 | — | — |
| GRIND SPECS | % minus | | | | | |

-continued

| | Prochlorite[1] Talc | Georgia[1] Kaolin | Calcined[2] Clay | Ball Clay[1] (Weldon) | Ball Clay[1] (Victoria) |
|---|---|---|---|---|---|
| 325 Mesh | — | — | — | — | — |

[1] Products of United-Sierra Div., Cyprus Mines Corp.
[2] Product of English China Clays Sales Co. Ltd.

The invention in its broader aspects is not limited to the specific embodiments shown and described. Departures may be made from such detailed embodiments without departing from the principles of the invention and without sacrificing its chief advantages. For example, for some uses, a die plate member can be machined from a block of plastic.

What is claimed is:

1. A hollow mill cutting tool capable of forming a plurality of closely spaced cylindrical pins on one face of a plate member by removing material from the plate member, comprising: a generally cylindrical member terminating in a tip portion having a toroidal cross-section adjacent said cylindrical member and said tip portion having its axis aligned with said cylindrical member, the inside diameter of said tip portion selected to be the desired diameter of the cylindrical pin, said tip portion including
   a. a plurality of forward helical surfaces that each terminate at their forward end in a cutting edge, each said helical surface extending rearwardly along a cylindrical path from said cutting edge at an angle of from 9° to 11° with a plane transverse of said axis;
   b. a plurality of back helical surfaces, each of said back helical surfaces adjacent its rearward end being inclined at an angle of at least 55° to a plane parallel to said axis, each of said forward helical surfaces being connected to one of said back helical surfaces; and
   c. a plurality of generally longitudinally-extending surfaces, with each of said longitudinally-extending surfaces connected at one end to the forward end of one of said forward helical surfaces to form one of said cutting edges, and the other end of each of said longitudinally-extending surfaces connected to the rear end of an adjacent back helical surface.

2. The cutting tool of claim 1 in which said cutting edges each lie in a common plane transverse of said longitudinal axis.

3. The cutting tool of claim 1 in which said front helical surface extends rearwardly along a cylindrical path from said cutting edge at an angle of about 10° with a plane transverse of said longitudinal axis.

4. The cutting tool of claim 1 in which each back helical surface adjacent its rearward end is inclined at an angle of about 55° to a plane parallel to said longitudinal axis.

5. The cutting tool of claim 1 in which the number of said cutting edges, said front helical surfaces, said back helical surfaces, and said longitudinal surfaces is two.

6. The cutting tool of claim 2 in which said cutting edges extend radially out from said longitudinal axis and across the thickness of said toroidal cross-section.

* * * * *